July 21, 1959 — A. F. STAGMEIER — 2,895,656
CONTAINER CLOSURE
Filed Jan. 10, 1956 — 3 Sheets-Sheet 1
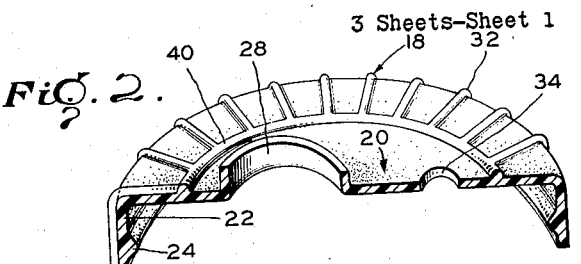
Fig. 2.
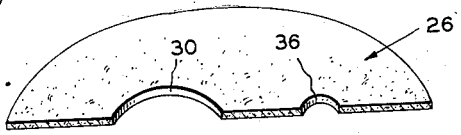
Fig. 3.
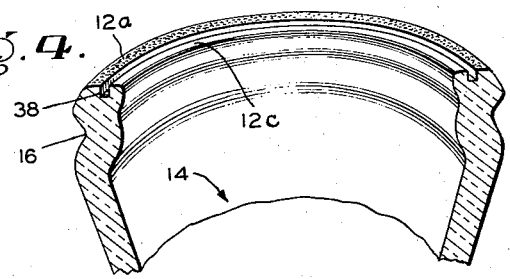
Fig. 4.
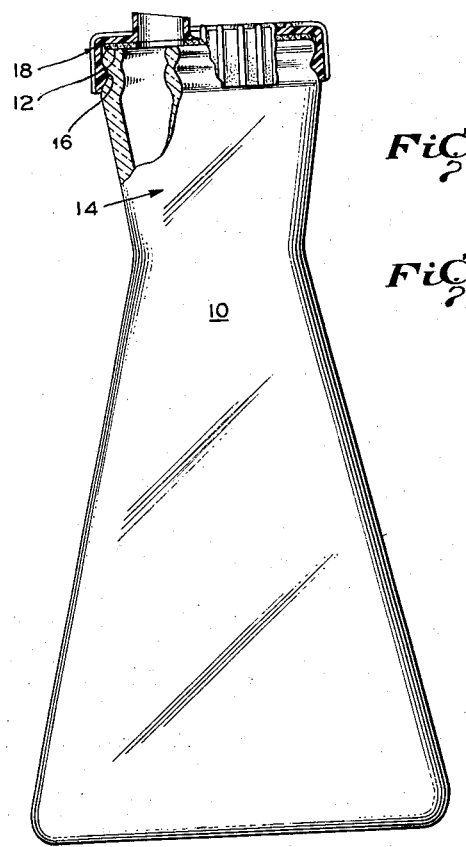
Fig. 1.
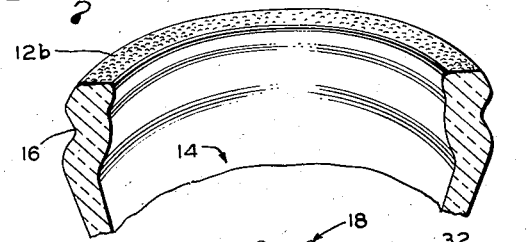
Fig. 4a.
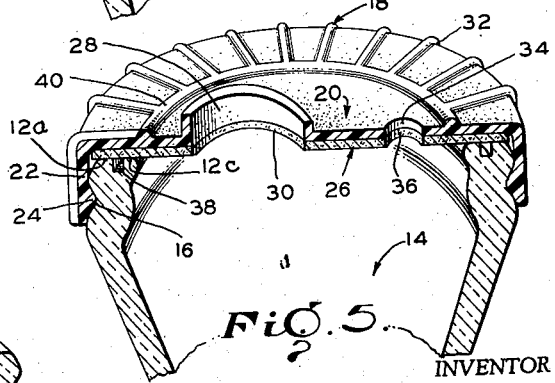
Fig. 5.
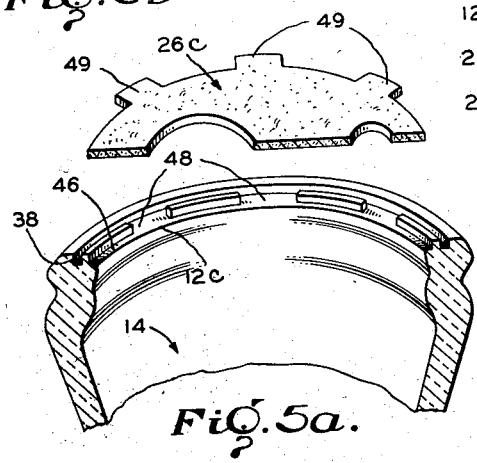
Fig. 5b.
Fig. 5a.
INVENTOR
Arthur F. Stagmeier July 21, 1959     A. F. STAGMEIER     2,895,656
CONTAINER CLOSURE
Filed Jan. 10, 1956     3 Sheets-Sheet 2
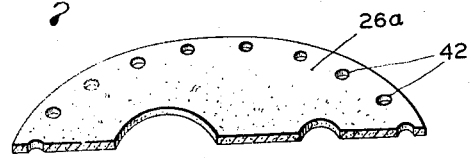
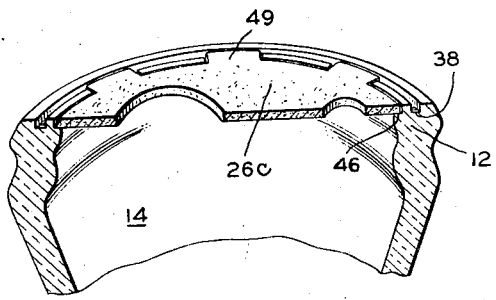
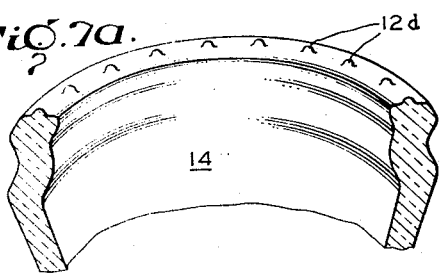
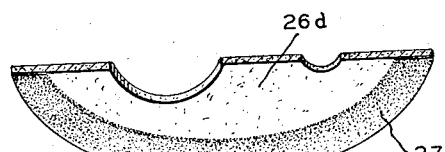
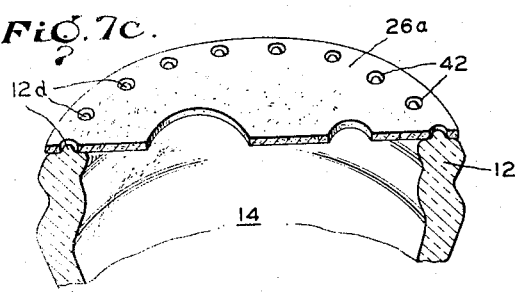
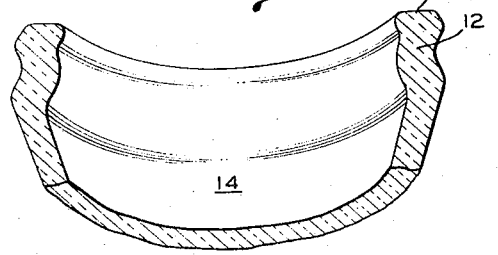
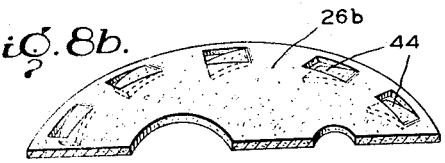
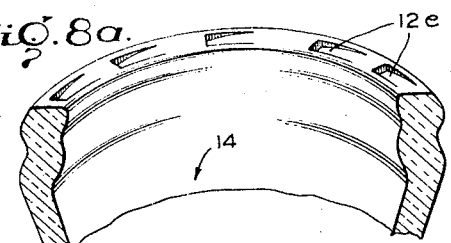
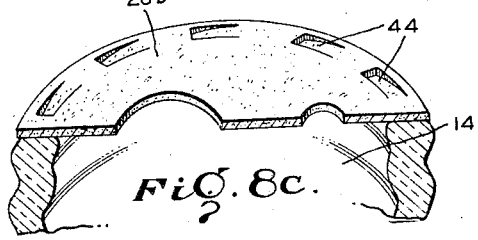
INVENTOR
Arthur F. Stagmeier.

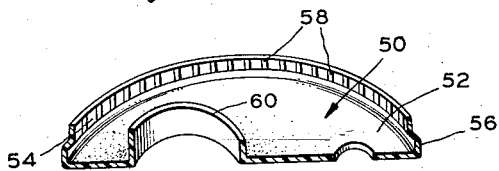
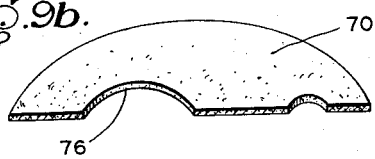
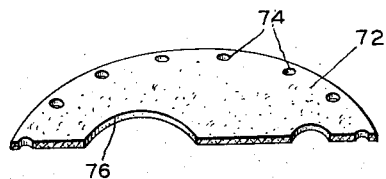
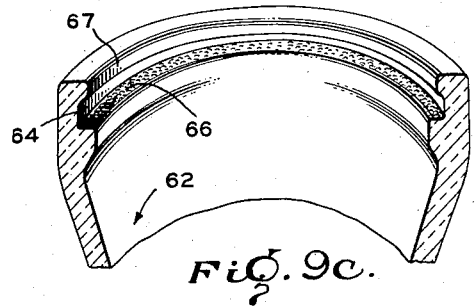
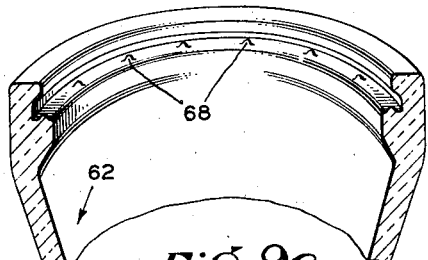
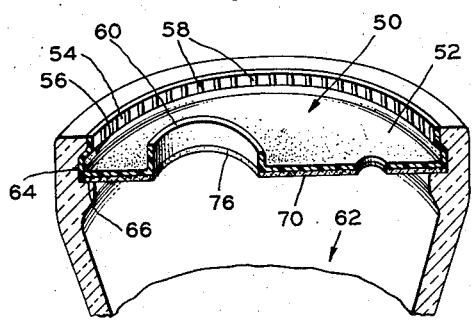
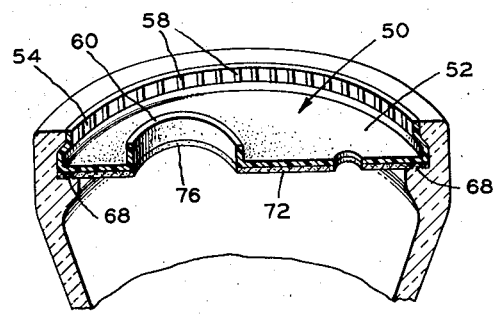
INVENTOR
Arthur F. Stagmeier.

United States Patent Office 2,895,656
Patented July 21, 1959

2,895,656

CONTAINER CLOSURE

Arthur F. Stagmeier, New York, N.Y., assignor to General Foods Corporation, White Plains, N.Y., a corporation of Delaware Application January 10, 1956, Serial No. 558,308

3 Claims. (Cl. 222—542)

This invention relates to a novel closure having a pouring spout adapted to be readily opened and closed.

For dispensing fluids and powders from bottles and similar containers it is desirable to have readily opened and closed dispensing means on the container closure. In the case of salad dressing mixes to be dissolved or dispersed in oil, vinegar and water by shaking in a bottle, it is particularly desirable that the closure have a spout which can be readily opened and closed for pouring of the contents without having to remove the cap from the container. It is also desirable that this combination container closure-pourspout be inexpensive and easily cleaned.

I have provided a container closure-pourspout which practically satisfies these requirements. The invention comprises an annular container mouth having a free end which may be formed irregularly for frictional contact with a gasket. A gasket is non-rotatably seated on the free end of the container mouth, and a cap rotatable on the container mouth bears on the gasket maintaining it in frictional contact with the free end of the container mouth. The cap has a spout opening formed in its top eccentric to its axis of rotation on the container mouth. The gasket also has an opening eccentric to the axis of rotation of the cap and adapted to register with the spout opening as the cap is twisted with respect to the container mouth.

The invention will be more clearly understood by reference to the accompanying drawings in which:

Fig. 1 is an elevation view of the preferred form of container closure-pourspout with parts broken away;

Fig. 2 is a perspective sectional view of a cap for the container;

Fig. 3 is a perspective sectional view of a gasket for the container;

Fig. 4 is a perspective sectional view of a portion of a container mouth;

Fig. 5 is a perspective sectional view of the cap, gasket and container mouth in Figs. 2, 3 and 4 as they are assembled on the container in Fig. 1;

Figs. 4a, 5a, 6a, 7a, 8a, 9c and 9e are perspective sectional views of other container mouth modifications like those in Fig. 4;

Figs. 5b, 6b, 7b, 8b, 9b and 9d are perspective sectional views of other gasket modifications similar to those in Fig. 3;

Fig. 9a is a perspective sectional view of another form of container cap;

Figs. 5c, 6c, 7c, 8c, 9f and 9g are perspective sectional views of other forms of container closure-pourspouts assembled from parts shown in Figs. 5a through 9e.

Referring to the drawings wherein similar parts are referred to by similar reference characters, a salad dressing bottle 10 has a free end 12 surrounding the container mouth 14, said end 12 being irregularly formed in any of the ways described in detail hereinafter. The outer circumferential surface of the container mouth has an annular recess 16 adjacent to its free end adapted to receive a flexible cap 18 with a snap fit. The flexible cap 18 is preferably made of a flexible plastic such as polyethylene. A preferred form of the cap (Fig. 2) comprises a flat top portion 20 having a cylindrical side portion 22. An annular bead 24 is integrally formed on the inner surface of side portion 22. The bead 24 is complementary to the annular recess 16 on the container mouth and is adapted to fit matingly in said recess 16 with a snap fit. A gasket 26 (Fig. 3) blanked in the form of a circular disc and made of any suitable composition such as cellulose acetate, vinyl chloride, waxed paperboard, cork and the like is adapted to be snapped into the cap between its annular bead 24 and its top 20.

When the cap 18 with the gasket 26 fitted therein is snapped onto the container mouth 14, the peripheral portions of the gasket seat on and frictionally engage the free end 12 of the container mouth 14 which is irregularly formed as stated above so that the gasket 26 is non-rotatable with respect to the cap. The cap 18 is guided for co-axial rotation with respect to the container mouth 14 and the gasket 26 by bead 24 traveling in the recess 16.

The cap has a spout opening formed in its top 20 as at 28. The spout opening is offset from the center of the cap and thus is eccentric to the axis of rotation of the cap. The gasket 26 has an opening 30 similarly offset from its center and eccentric to the axis of rotation of the cap. The cap is provided with a number of ribs 32 which facilitate gripping of the cap for twisting. The spout 28 is opened or closed depending upon the position of the cap relative to the gasket 26 as the cap is twisted. In this way the container contents can be dispensed from the bottle either completely in one pouring or in a series of pourings. To facilitate pouring, a vent hole 34 is provided in cap top 20 and a vent hole 36 is provided in gasket 26. The vents 34 and 36 are opposite each other when the gasket opening 30 is opposite spout opening 28. A dam is formed on the cap by an annular rib 40 projecting upwardly from its top and tending to keep slippery materials from spilling from the spout onto ribs 32.

It will be noted in Fig. 4 that the free end of the container mouth has a pebbled portion 12a and a flat annular inner portion 12c in substantially the same plane as 12a and separated therefrom by an annular indentation 38. This indented portion provides a well or trap for any liquid which might pass over the free end of the container mouth. The gasket 26 bears against the inner surface of the cap top 20 and is thereby maintained against the smooth free end portion 12c sealing the container mouth. The pebbled free end portion 12a, being in frictional engagement with the underface of gasket 26, restrains the gasket against rotation with respect to the container mouth when the cap 18 is twisted. In some applications it will not be necessary to provide a seal like that afforded by the container mouth in Fig. 4, and the entire free end can be pebbled as at 12b (Fig. 4a) providing greater frictional contact with the gasket.

Modified forms of the invention are shown in other figures in the drawings. Instead of a pebbled free end 12a or 12b the container mouth's free end has projections 12d formed thereon in Fig. 7a which are adapted to mate with perforations 42 in gasket 26a (Fig. 7b), so that when the cap 18 has the gasket 26a housed therein the cap can be snapped onto the container with the same advantages of the embodiment assembled in Fig. 5. Instead of projections 12d the free end of the container mouth 14 has a series of indentations 12e in Fig. 8a which receive a series of ear portions 44 in gasket 26b (Fig. 8b) when the parts are assembled (Fig. 8c). In still another embodiment a container mouth like that in Fig. 4 has a gasket seat 46 formed on the inner periphery of free end portion 12c as shown in Fig. 5a; a series of gaps 48 may be located in the free end portion 12c between seat 46 and indentation 38 to receive a like number of lateral projections or wings 49 formed in gasket 26c (Fig. 5b). The thickness of the gasket 26c is great enough that it projects above the end of the container mouth for pressure engagement with the cap. The gasket 26c is thereby rendered non-rotatable with respect to the interrupted free end 12c as shown in Fig. 5c as well as the cap 18 when the cap is snapped over the container mouth. A less preferred embodiment is illustrated in Figs. 6a, 6b and 6c. In this form of closure a gasket 26d (Fig. 6b) has a tacky composition 27 applied to its underface which adheres to container free end 12f and is thereby rendered non-rotatable relative to the container mouth 14 so that the spout opening 28 of cap 18 can be moved to index with gasket opening 30.

In Figs. 9a, 9b and 9c, another form of closure-pourspout is illustrated wherein a cap 50, which is shown in Fig. 9a, fits within the confines of a container mouth 62 in Fig. 9c with a gasket 70 in Fig. 9b being retained therebetween. The cap 50 comprises a flat circular portion 52 having an upwardly extending side wall portion 54. The upper free end of the side wall portion 54 has a diameter smaller than the lower portion of side wall 54 such that an annular outward projection 56 is defined in the lower portion of the side wall. Vertical ribs 58 are provided on the inner surface of the upper portion of side wall 54 and serve the same function as ribs 32 in cap 18. A spout 60 is offset from the center of the cap 52 like spout 28 in cap 18. The container mouth 62 has an annular recessed portion 64 on its inner periphery and a pebbled free end 66 below a lip portion 67 for retaining the annular projection 56 of cap side wall 54. Instead of being pebbled the free end 66 may have upwardly extending projections 68 as shown in Fig. 9e like those in Fig. 7a, and gasket 72 (Fig. 9d) may have perforations 74 like those in Fig. 7b. The gaskets 70 and 72 shown in Figs. 9b and 9d are adapted to be inserted in the container mouths shown in Figs. 9c and 9e, respectively, in non-rotatable engagement with the pebbled surface 66 and the perforations 68 respectively.

Employing the elements shown in Figs. 9a–9e the closure assembly appears as illustrated in Fig. 9f or 9g. Thus, when the cap 50 is inserted with gasket 70 or 72 into place within the container mouth 62 the annular portion 56 of the cap 50 snaps into place within the annular portion 64 so that the gasket 70 or 72 is retained against the free end portion 66 or projections 68. In this manner, the gasket is retained against rotation with respect to the container mouth 62 but the cap is rotatable with respect to the gasket. The spout 60 is thereby brought to an open or closed position relative to gasket openings 76 or 78 (Fig. 9b or 9d).

It will be noted in all of the foregoing modifications that the gasket is rendered non-rotatable relative to the free end of the container mouth while sealing it and that the cap can be twisted relative to the gasket to readily open and close its spout opening relative to the opening in the gasket. In general, the free end of the container mouth has an irregular surface which facilitates frictional contact with the gasket rendering the latter non-rotatable. This avoids any necessity for a tacky coating to cause non-rotatable adherence to the end of the container mouth, thereby allowing the gasket to be cleaned and reused with the cap. A preferred form of irregular free end is the pebbled surface of the free end described hereinabove. The pebbled surface provides an adequate degree of frictional contact with a gasket while allowing a minimum of leakage between the surface of the gasket and the free end of the container mouth. The annular indentation provided between the inner and outer peripheral edges of the free end of the container mouth provides a trap reducing any leakage of material between the end of the container mouth and the gasket and thus augments the sealing integrity of the gasket seat provided by an irregular surface on the free end of the container mouth.

It will be understood that while the invention has been described in part by means of specific examples, reference should be had to the appended claims for a definition of the scope of the invention.

What is claimed is:

1. A container closure-pourspout which comprises an annular container mouth having a pebbled free end, said free end having an annular indentation between its outer and inner peripheral edges, a gasket seated on the free end of the container mouth, a cap mounted on said container mouth bearing on said gasket and maintaining it in frictional contact with the free end of the container mouth, and an integral depending skirt on said cap adapted to snap fit onto said container mouth and be rotatably mounted thereon, the cap having a spout opening eccentric to its axis of rotation on the container mouth, the gasket having an opening eccentric to the axis of rotation of the cap and adapted to register with the spout opening when the cap is rotated.

2. A container closure-pourspout which comprises an annular container mouth, a gasket seated on the free end of the container mouth, the free end of the container mouth having an annular indentation between its outer and inner peripheral edges, the free end portion between said annular indentation and the outer peripheral edge of the container mouth being pebbled, a cap mounted on said container mouth bearing on said gasket and maintaining it in sealing relation with the free end of the container mouth and in frictional contact with the pebbled portion thereof, and an integral depending skirt on said cap adapted to snap fit onto said container mouth and be rotatably mounted thereon, the cap having a spout opening eccentric to its axis of rotation on the container mouth, the gasket having an opening eccentric to the axis of rotation of the cap and adapted to register with the spout opening when the cap is rotated.

3. A container closure-pourspout which comprises an annular container mouth having a pebbled free end, a gasket seated on the free end of the container mouth, a removable cap mounted on said container mouth bearing on said gasket and maintaining it in frictional contact with the free end of the container mouth, and an integral laterally extending circumferential skirt on said cap adapted for rotatable snap-fit engagement with said container mouth, the cap having a spout opening eccentric to its axis of rotation on the container mouth, the gasket having an opening eccentric to the axis of rotation of the cap and adapted to register with the spout opening when the cap is rotated.

References Cited in the file of this patent

UNITED STATES PATENTS

| | | |
|---|---|---|
| 229,805 | Coleman et al. | July 13, 1880 |
| 833,405 | Mangels | Oct. 16, 1906 |
| 1,420,861 | Porter et al. | June 27, 1922 |